United States Patent
Xie

(10) Patent No.: US 12,299,587 B2
(45) Date of Patent: *May 13, 2025

(54) EVOLUTION OF NON-PLAYER CHARACTERS

(71) Applicant: Tencent Technology (Shenzhen) Company Limited, Guangdong (CN)

(72) Inventor: Wei Xie, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/636,062

(22) Filed: Apr. 15, 2024

(65) Prior Publication Data

US 2024/0256907 A1     Aug. 1, 2024

Related U.S. Application Data

(63) Continuation of application No. 18/107,918, filed on Feb. 9, 2023, now Pat. No. 12,026,629, which is a
(Continued)

(30) Foreign Application Priority Data

Apr. 20, 2017    (CN) .......................... 201710261467.5

(51) Int. Cl.
*G06N 5/02*      (2023.01)
*A63F 13/56*     (2014.01)
*A63F 13/58*     (2014.01)

(52) U.S. Cl.
CPC ................ *G06N 5/02* (2013.01); *A63F 13/56* (2014.09); *A63F 13/58* (2014.09); *A63F 2300/64* (2013.01); *A63F 2300/65* (2013.01)

(58) Field of Classification Search
CPC . G06N 5/02; G06N 3/006; G06N 7/01; A63F 13/56; A63F 13/58; A63F 13/577;
(Continued)

(56) References Cited

U.S. PATENT DOCUMENTS

| 9,283,473 B2 | 3/2016 | Tagawa et al. |
| 2003/0060248 A1 | 3/2003 | Yamashita |

(Continued)

FOREIGN PATENT DOCUMENTS

| CN | 103472756 A | 12/2013 |
| CN | 103785170 A | 5/2014 |

(Continued)

OTHER PUBLICATIONS

"Disgaea D2: The Complete Guide", ASCII Media Works, Apr. 26, 2013, 1st edition, p. 187 (5 pages).
(Continued)

*Primary Examiner* — Kevin Y Kim
(74) *Attorney, Agent, or Firm* — ArentFox Schiff LLP

(57) ABSTRACT

A method for configuring a character in a game includes generating a first non-player character of a first generation in the game, the first generation being associated with a first difficulty level, and detecting a target event affecting the first non-player character of the first generation in the game. The method further includes, based on the first non-player character of the first generation affected by the target event, obtaining an evolution indicator of an evolution from the first generation to a second generation associated with a second difficulty level higher than the first difficulty level. The method further includes, in response to the evolution indicator indicating that the evolution from the first generation to the second generation is successful, generating the second generation comprising two or more second non-
(Continued)

player characters while one or more non-player characters of the first generation remain in the game.

20 Claims, 5 Drawing Sheets

Related U.S. Application Data continuation of application No. 16/445,694, filed on Jun. 19, 2019, now Pat. No. 11,620,536, which is a continuation of application No. PCT/CN2018/082513, filed on Apr. 10, 2018.

(58) Field of Classification Search
CPC ...... A63F 13/47; A63F 13/67; A63F 2300/64; A63F 2300/65
See application file for complete search history.

(56) References Cited

U.S. PATENT DOCUMENTS

| | | |
|---|---|---|
| 2010/0056275 A1 | 3/2010 | Wilson et al. |
| 2010/0279762 A1 | 11/2010 | Sohn et al. |
| 2015/0126286 A1 | 5/2015 | Guo |
| 2016/0023102 A1 | 1/2016 | Tagawa et al. |
| 2016/0279522 A1 | 9/2016 | De Plater et al. |

FOREIGN PATENT DOCUMENTS

| | | |
|---|---|---|
| CN | 105561578 A | 5/2016 |
| CN | 106102849 A | 11/2016 |
| CN | 106371797 A | 2/2017 |
| CN | 106390456 A | 2/2017 |
| CN | 107019912 A | 8/2017 |
| JP | 2015-154952 A | 8/2015 |
| KR | 10-2008-0051328 A | 6/2008 |

OTHER PUBLICATIONS

"Fighting Studio, Breath of Fire V Dragon Quarter Complete Capture Guide", Capcom Co., Ltd., Jan. 10, 2003, 1st edition, p. 16 (5 pages).
"How to defeat Lynel and 22 spawn locations, how to easily defeat it in 1 minute," The Legend of Zelda:Breath of the Wild Cheats, Available on internet at: <https://zelda-bow.xyz/rinel-battle>, Apr. 11, 2017, (16 pages).
"Kingdom Hearts II Final Mix+ Ultimania", Square Enix Co., Ltd., Feb. 20, 2008, 4th edition, pp. 254 (5 pages).
"Pokemon Black 2 and Pokemon White 2", Famitsu DS Plus Wii, Enterbrain Inc., Sep. 21, 2012, vol. 14, No. 11, pp. 24 (6 pages).
"The Legend of Zelda: Breath of the Wild", Weekly Famitsu, Kadokawa Co., Ltd., Japan, Mar. 3, 2017, vol. 32, No. 11, pp. 187, 216 (6 pages).
"Zelda: Breath of the Wild—Armor Sets," Shacknews, Mar. 7, 2017, URL <https://www.shacknews.com/article/99306/zelda-breath-of-the-wild---armor-sets> (4 pages).
"Zelda: Breath of the Wild, Anything you can imagine is possible," Money Today, Available on internet at:: <https://news.mt.co.kr/mtview.php?no=2017031621108162845>, Mar. 16, 2017 (17 pages).
Giantbomb, "Death," Feb. 15, 2013, https ://web.archive.org/web/20130215025931/https://www.giantbomb.com/death/3015-725/ (Year: 2013).
Giantbomb, "Health," Feb. 17, 2013, https://web.archive.org/web/20130217093748/https://www.giantbomb.com/health/3015-130/ (Year: 2013).
International Search Report and Written Opinion received for PCT Patent Application No. PCT/CN2018/082513, mailed on Jun. 21, 2018, 14 pages (6 pages of English Translation and 8 pages of Original Document).
Japanese Office Action issued Nov. 5, 2020 in Application No. 2019-534753 with English Translation.
Keiki Fantasy Star Online 2 for Episode 2, Kadokawa, Y.K., Jul. 17, 2014, Edition 1, pp. 68.
Metal Gear Wiki, "Revenge System (enemy preparedness)," Jul. 15, 2016, https://metalgear.fandom.com/wiki/Revenge_System_(enemy preparedness)?oldid=249049#cite_note-tpprevenge_levels-2 (Year: 2016).
Office Action received for Chinese Patent Application No. 201710261467.5, mailed on Aug. 21, 2018, 13 pages (7 pages of English Translation and 6 pages of Original Document).
Office Action received for Chinese Patent Application No. 201710261467.5, mailed on May 31, 2018, 9 pages (5 pages of English Translation and 4 pages of Original Document).
Office Action received for Chinese Patent Application No. 201710261467.5, mailed on Nov. 7, 2018, 14 pages (8 pages of English Translation and 6 pages of Original Document).
Office Action received for Japanese Patent Application No. 2019-534753, mailed on Jun. 16, 2020, 12 pages (6 pages of English Translation and 6 pages of Original Document).
Office Action received for Korean Patent Application No. 10-2019-7020698, mailed on Mar. 19, 2021, 14 pages (8 pages of English Translation and 6 pages of Original Document).
Wen Juan Zhou, "The Research of Non-player Characters Adaptive Behavior in Digital Game", China's Finest Master Degree Theses Database, 9th Edition, Sep. 15, 2015.

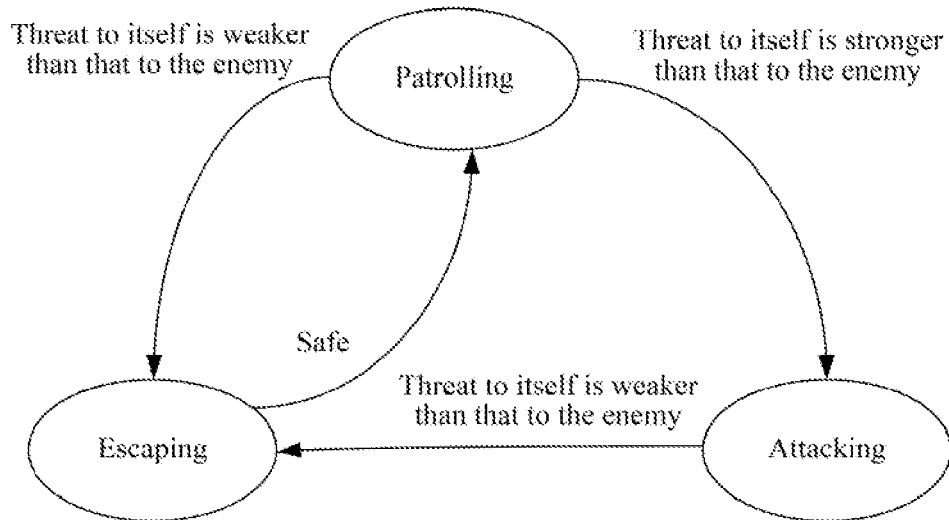

FIG. 1

```
struct Character{
    struct Position pos;        //A map position at which a player is located
    int screenX,screenY;        //A screen position at which a player is located
    int animDir, animAction, animNum; //Animation information, character actions,
                                      and animation frame number
    int rank;                   //Military rank
    int health;                 //Health points
    int num;                    //How many people are there in a current group
    int group;                  //Troop number
    int style;                  //Troop property (infantry, cavalry, and the like)
    struct AnimationObject animObj;  //An animation object of a complex animation
};
```

FIG. 2

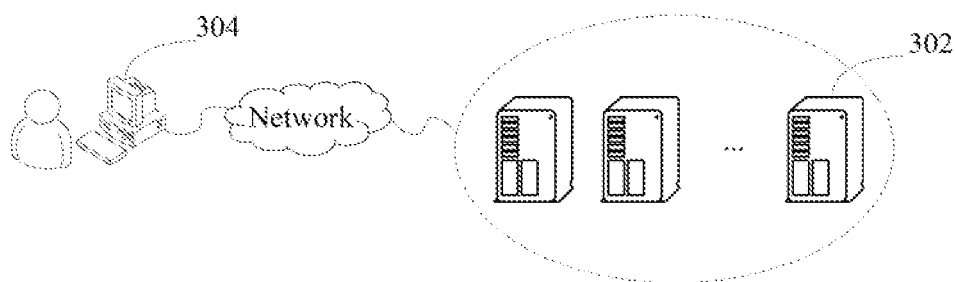

FIG. 3

```
module.exports = {
    "config_revolution": [
        {
            "snake_curr_level":1,              //Level on which a snake is currently located
            "snake_born_speed": 210,           //Initial moving speed of the snake
            "snake_born_rotate_speed": 210,    //Initial turning angular velocity of the snake
            "robot_snake_acc_times": 2.3,      //Moving speed increases by several times
                                                 in an accelerated state
            "robot_snake_rotate_times": 1.3,   //Rotation speed increases by several times
                                                 in an accelerated state
            "robot_snake_rotate_time": 2,      //Average interval (second) of random
                                                 turning of an AI snake
            "robot_snake_find_food": 0.5,      //Average interval (second) of food finding of
                                                 the AI snake
            "robot_snake_dodge_crash": 1,      //Average interval (second) of crash dodging of
                                                 the AI snake
            "robot_snake_acc_dead_food": 26,   //Whether the AI snake accelerates when
                                                 encountering dead residual food
            "robot_snake_view_port": 360       //Range of field of view of the AI snake
        },
        {
            "snake_curr_level":2,
            "snake_born_speed": 213,
            "snake_born_rotate_speed": 219,
            "robot_snake_acc_times": 2.3,
            "robot_snake_rotate_times": 1.31,
            "robot_snake_rotate_time": 1.8,
            "robot_snake_find_food": 0.48,
            "robot_snake_dodge_crash": 0.85,
            "robot_snake_acc_dead_food": 30,
            "robot_snake_view_port": 380
        },
```

FIG. 8

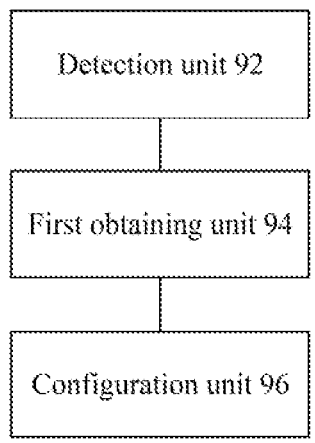

FIG. 9

EVOLUTION OF NON-PLAYER CHARACTERS

RELATED APPLICATION

The present application is a continuation of U.S. application Ser. No. 18/107,918 filed on Feb. 9, 2023, which is a continuation of U.S. application Ser. No. 16/445,694 filed on Jun. 19, 2019, which is a continuation of International Application No. PCT/CN2018/082513, filed on Apr. 10, 2018, which claims priority to Chinese Patent Application No. 201710261467.5, entitled "CHARACTER CONFIGURATION METHOD AND APPARATUS" filed on Apr. 20, 2017. The entire disclosures of the prior applications are hereby incorporated by reference.

FIELD OF THE TECHNOLOGY

This application relates to a character configuration method and apparatus, a storage medium, and an electronic apparatus.

BACKGROUND OF THE DISCLOSURE

Artificial Intelligence (AI) is a technical science that studies and develops theories, methods, techniques, and application systems for simulating, extending, and expanding human intelligence. In the related technologies, artificial intelligence is widely used in games, and the main objective of the game AI is to make the characters with AI become intelligent.

Game AI, that is, an artificial intelligence character in a game, refers to a character having intelligence in a game in this application. The game AI simulates various behaviors of a real person player (also referred to as a player or a player character), and can simulate an operation of a real person to battle against the player. Generally in the game, the player obtains skill and experience improvement by battling with the game AI.

For example, in the battle game, the behavior of the object is mainly controlled in the implementation method related to the game AI. On this basis, the design of the AI mainly includes two methods: rule setting and behavior enumeration. The rule setting is to explicitly set a series of rules and then assign corresponding values to related objects, so that the entire system runs according to the rules. Once the rules are set, intelligent objects will perform well-behaved execution according to a range limited by the rules. Because of these existing rules, the AI behaviors are basically predictable, and a player may learn how to circumvent these rules after a few attempts. The behavior enumeration is to basically conceive of all the possible behaviors of the corresponding objects, and then manually determine all responses. In this way, all the behavior branches are built into a tree-like system, or a state machine is used to maintain trigger conditions and switching logics between the various behaviors. Because thoughtful consideration is needed, and a corresponding response needs to be set for each possible behavior, one of the disadvantages of this method is the large amount of computation. Another shortcoming is that given the same stimulus, the behavior of the game object is the same. After the behavior is repeated for several times, the player will find that the behavior of the game object is a fixed machine behavior. Consequently, user experience is affected.

In the technical solution of the related technologies, a single AI character is used as a design objective in the game design, and one or two of the foregoing design methods are used simultaneously to achieve the objective of AI intelligence. By constructing various state machines and behavior trees to improve the behaviors of AI characters, the AI characters become intelligent to the greatest extent. For example, in a battle game, an AI character usually has the following actions:

Action 1: when no player is found, patrolling a particular area;

Action 2: when a player is found, chasing the player and attacking the player character; and Action 3: when the blood volume of the AI character is less than a particular volume, escaping when engaging the player.

Herein, for the reaction of the AI character, three states (patrolling, attacking, and escaping) are abstracted, and an interface of each state can include three logics: an entry state, an execution state action, and an exit state. The specific state diagram is shown in FIG. 1. Subsequently the AI character will switch among various states according to a trigger from a game environment. For example, if an AI character in a patrolling state encounters with a player character, the AI character determines whether a threat to the AI character is weaker than the threat to the player. If the AI character determines that the threat to the AI character is weaker than the threat to the player, the AI character escapes. Otherwise, the AI character attacks the player. When the AI character is in an escaping state, the AI character also determines, in real time, whether a safe status is restored. If the AI character determines the safe status is restored, the AI character enters the patrolling state. Otherwise, the AI character continues to escape. The AI character in an attacking state also determines, in real time, whether the threat to the AI character is weaker than the threat to the player. If the AI character determines the threat to the AI character is weaker than the threat to the player, the AI character escapes. Otherwise, the AI character continues to launch an attack against the player character.

In some examples, types of the states may be added, and the state machine may be made more complex, so that the corresponding AI is more intelligent, and can process scenario situations with more types.

Generally, a data structure of a single AI character is shown in FIG. 2. Attribute characteristics of the AI character (such as the geographical location of the player, etc.) are described in detail in the data structure. A value range of some probability events and the like may also be recorded. The attribute characteristics mainly include the map location, the screen location, the animation information, the military rank, and other information.

Disadvantages in the related technical solutions include: first, the routine of the behaviors is basically fixed, that is, there is no difference between AIs in a same type, and the same operating mechanism is used, so that the player can understand the operating manner of a robot after a few attempts, and can use a corresponding manner for cracking and coping. Secondly, to make a perfect AI response mechanism, the workload (e.g., computational requirements) of exhausting all possible behaviors is excessively large, which is not suitable for small games.

Currently, no effective solution has been proposed to resolve the technical problem in the related technologies that an operating mechanism of an artificial intelligence character can be known.

SUMMARY

The aspects of this application provide methods and apparatuses for configuring a character in a game. In some examples, an apparatus for configuring a character in a game includes processing circuitry.

The processing circuitry detects a target event associated with a first character in the game. The first character is a non-player character that has been generated in the game. The target event is used for modifying a target attribute value of the first character. The processing circuitry obtains configuration information according to the target event. The configuration information is used for configuring a second character so that a degree of modifying a target attribute value of the second character by the target event is less than a degree of modifying the target attribute value of the first character by the target event. The second character is a non-player character to be generated in the game. The processing circuitry generates the second character based on the configuration information.

In an embodiment, the processing circuitry determines a first attribute used for indicating that the degree of modifying the target attribute value of the second character by the target event is less than the degree of modifying the target attribute value of the first character. The processing circuitry further determines a second attribute used for executing a defense event for preventing the target event from occurring. According to at least one of the first attribute and the second attribute, the processing circuitry determines the configuration information.

In an embodiment, the processing circuitry saves an attribute that is used by a player character as the first attribute. The attribute indicates a degree of modifying a target attribute value of the player character by the target event is less than the degree of modifying the target attribute value of the first character.

In an embodiment, the processing obtains an evolution probability according to a level of the first character. When the evolution probability is greater than a preset probability, the processing circuitry obtains the configuration information according to the target event.

In an embodiment, the processing circuitry configures, based on the configuration information, attributes of a plurality of second characters generated such that the plurality of second characters belongs to a same level.

In an embodiment, the processing circuitry detects the target event when the player character launches an attack against the first character. The processing circuitry also detects the target event when a game environment of a target position modifies the target attribute value of the first character.

In an embodiment, the processing circuitry detects a first event when the player character launches an attack against the first character. The first event is used for reducing the target attribute value of the first character to a first value. The first value is less than a maximum value of the target attribute value of the first character and not less than a minimum value of the target attribute value of the first character. The processing circuitry further detects a second event when the player character launches an attack against the first character. The second event is used for reducing the target attribute value of the first character to a second value. The second value is a positive number.

In an embodiment, the processing circuitry detects the first event that is initiated by the player character and that is used for reducing the target attribute value of the first character to the minimum value of the target attribute value of the first character.

Aspects of the disclosure also provide a non-transitory computer-readable medium storing instructions which when executed by a computer cause the computer to perform the method for configuring a character in a game.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the figures:

FIG. 1 is a schematic diagram of state conversion of an AI character in the related technologies.

FIG. 2 is a schematic diagram of a data structure of an AI character in the related technologies.

FIG. 3 is a schematic diagram of a hardware environment of a character configuration method according to an embodiment of this application.

FIG. 8 is a schematic diagram of an AI attribute of the AI snake according to an embodiment of this application.

FIG. 9 is a schematic diagram of a character configuration apparatus according to an embodiment of this application.

DESCRIPTION OF EMBODIMENTS

To make a person skilled in the art better understand solutions of this application, the following clearly and completely describes the technical solutions in the embodiments of this application with reference to the accompanying drawings in the embodiments of this application. The described embodiments are some rather than all of the embodiments of this application. All other embodiments obtained by persons skilled in the art based on the embodiments of the present application shall fall within the protection scope of the present application.

It is noted that in the specification, claims, and accompanying drawings of this application, the terms "first", "second", and so on are intended to distinguish between similar objects rather than indicating a specific order. It is understood that data used in this way can be interchanged in an appropriate case, so that the embodiments of this application that are described herein can be implemented in a sequence other than those sequences illustrated or described herein. Moreover, the terms "include", "comprise", and any variants thereof are intended to cover a non-exclusive inclusion. For example, a process, method, system, product, or device that includes a list of steps or units is not necessarily limited to those steps or units that are clearly listed, but may optionally further include other steps or units not expressly listed or inherent to such a process, method, product, or device.

According to the embodiments of this application, a method embodiment of a character configuration method is provided.

In some embodiments, the character configuration method may be applied to a hardware environment consisting of a server 302 and a terminal 304 in FIG. 3. As shown in FIG. 3, the server 302 is connected to the terminal 304 through a network. The network includes, but is not limited to: a wide area network, a metropolitan area network, or a local area network, and the terminal 304 is not limited to a PC, a mobile phone, a tablet computer, or the like. The method in this embodiment of this application may be performed by the server 302, or may be performed by the terminal 304, or may be performed by both the server 302 and the terminal 304. When the terminal 304 performs the method in this embodiment of this application, the method may alternatively be performed by a client installed in the terminal 304.

Figure 4:
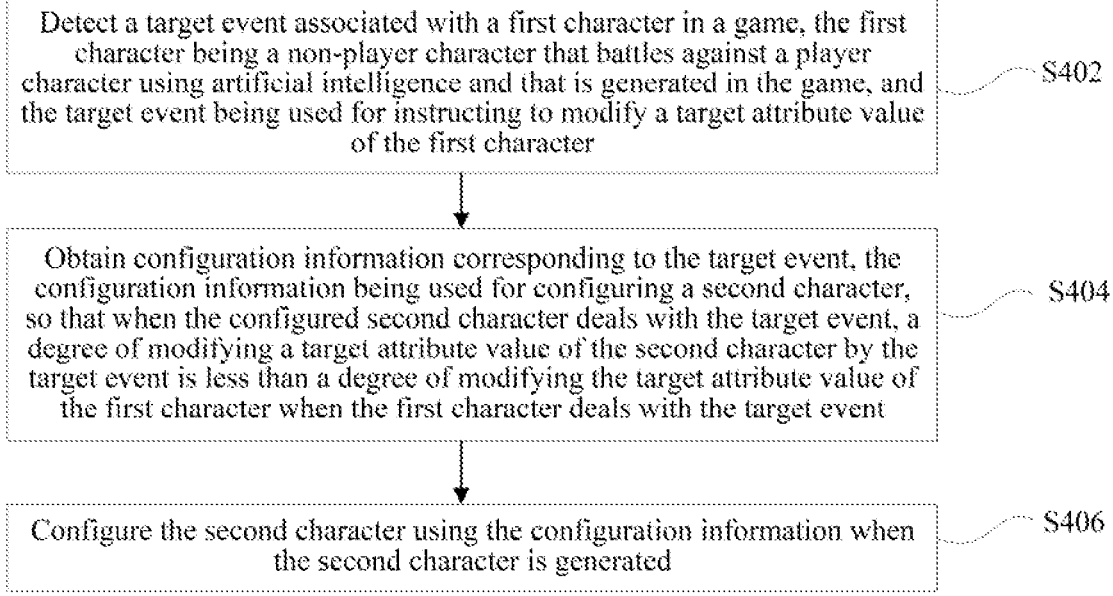
FIG. 4 is a flowchart of a character configuration method according to an embodiment of this application.

FIG. 4 is a flowchart of a character configuration method according to an embodiment of this application. As shown in FIG. 4, the method may include the following steps:

Step S402: Detect a target event associated with a first character in a game. The first character is a non-player character that battles against a player character using artificial intelligence and that is generated in the game. The target event is used for instructing to modify a target attribute value of the first character.

Step S404: Obtain configuration information corresponding to the target event. The configuration information is used for configuring a second character, so that when the configured second character deals with the target event, a degree of modifying a target attribute value of the second character by the target event is less than a degree of modifying the target attribute value of the first character when the first character deals with the target event. The second character is a non-player character to be generated in the game.

Step S406: Configure the second character using the configuration information when the second character is generated.

Through the foregoing step S402 to step S406, when the target event initiated for the first character in the game is detected, the configuration information corresponding to the target event is obtained, and the generated second character is configured using the configuration information, so that the degree of modifying the target attribute value of the second character by the target event is reduced when the configured second character deals with the target event. In this way, with the evolution of the non-player character, although a new character born each time has a same initial appearance, the new character has new skill attributes. For a large number of non-player characters in the game, due to different birth times, skill attributes owned by them are not completely the same, and skill attributes used for dealing with a same event are also different, so that the game characters cannot determine, through attempts for a plurality of times, the skill attributes used by the non-player characters when the non-player characters deal with a fixed event. In this way, the technical problem in the related technology that an operating mechanism of an artificial intelligence character can be known can be resolved, thereby preventing the operating mechanism of the artificial intelligence character from being known.

The foregoing game may be a game of any type. The first character is a non-player character attacked by the target event. The second character is a non-player character born in a next generation (or next level). The target event is an event that can cause damage to a particular attribute (e.g., the target attribute) of the first character. The target attribute includes but is not limited to life, a skill, a weapon, defense, and the like.

In current real-time multiplayer battle games, AI objects need to be used, for increasing game competition and fun. The AI may be used for training players to be familiarized with various operating skills in an initial period, or interacting with players when there are an insufficient number of online players to attract more real players. However, the current AI causes a relatively poor interactive effect due to various reasons.

This application implements a game AI (e.g., a non-player character using artificial intelligence) evolution method based on a biological evolution basic principle. By simulating a principle of biological evolution, a self-evolution capability is bestowed to a game AI system, so that the game AI obtains intelligence that increases with time natural development and various skill attributes. The design idea of the method is to use a whole game AI group as an evolution object, rather than using a single AI character as an object for evolution and upgrade. A specific implementation method is that, when a game AI character is killed by a real player, an evolution logic of the group is triggered, and the evolution logic obtains, according to a value of a generation (starting from the first generation or the first level by default) on which the killed AI is currently located, a probability that the generation can evolve a particular attribute property (such as skills), and determines whether evolution of this time can succeed. If the evolution succeeds, the AI born at this time point becomes a next generation or a next level by default, and the next-generation AI owns this attribute property by nature. As time passes, the game AI will have increasingly perfect intelligence and skill attributes.

Moreover, with the increase of the number of AIs killed by the player, the AI also triggers attribute increase of the skills that are already owned, and the probability is also obtained. Once the probability is successfully obtained, the next-generation AI born subsequently will have the attribute value by default. In such a growth system, growth curves of the AIs are different, and therefore the battle experiences of the rounds are not completely the same. This embodiment of this application is further described below in detail with reference to FIG. 4.

In the technical solution provided in step S402, the method detects a target event associated with a first character in a game. In an embodiment, the method detects the target event generated when the player character launches an attack against the first character when the first character battles against the player character, and detects the target event in which a game environment of a target position modifies the target attribute value of the first character when the first character is located at the target position of a map of the game.

The foregoing target attribute may be an attribute used for indicating life, a skill, a weapon, defense, and the like. For example, for a life attribute, the target event is an event for reducing an attribute value of the life attribute. For a skill attribute, the target event is an event for capturing the skill attribute of the first character or for reducing the damage of the skill attribute to the player character. For another example, for a weapon attribute, the target event is an event for capturing a weapon of the first character, reducing the damage caused by the weapon or destroying the weapon. For the remaining attributes, any event that can cause a change to an attribute value of a corresponding attribute is a target event, and the target events are not listed one by one in this application.

For the weapon attribute, when the first character battles against the player character, a target event generated when the player character launches an attack against the first character to capture the weapon of the first character is detected. If the weapon of the first character is captured successfully, a newly born character is triggered to evolve, so that the newly born character can escape or strike back in time when the player captures the weapon of the newly born character, and this is specifically implemented by configuring an escape skill attribute, a defense skill attribute, or the like of the newly born character.

The foregoing detecting the target event generated when the player character launches an attack against the first character may include the following two types. The first step is to detect a first event when the player character launches an attack against the first character. The first event is used for reducing the target attribute value of the first character to a first value. The first value is less than a target attribute maximum value (e.g., a maximum value that the attribute allows to configure) of the first character and not less than a target attribute minimum value (e.g., a minimum value that the attribute allows to configure) of the first character. The second step is to detect a second event when the player character launches an attack against the first character. The second event is used for reducing the target attribute value of the first character to a second value. The second value is a positive number.

The first value may be a trigger point at which the non-player character is triggered to evolve, and an attribute value of the target attribute falls within a particular range (e.g., an attribute maximum value and an attribute minimum value), and the first value is a value in the range. For example, detecting the first event in which the player character launches an attack against the first character may be detecting the first event that is initiated by the player character and that is used for reducing the target attribute value of the first character to the target attribute minimum value. That is, the evolution event is triggered to occur when it is specified to reduce the attribute value of the attribute to the minimum value.

For example, if the target attribute is a life attribute, the first value may be 50% of the life attribute value. When the first character is attacked by the first event and the health points are reduced to 50% or below, the non-player character is triggered to evolve, so as to evolve a skill attribute for fighting against the first event, so that when the first event is encountered next time, the damage brought by the first event to the first character is avoided or reduced.

The second value indicates that when a particular event causes fixed damage (e.g., causes a damage that the attribute value is reduced by the second value) to the first character, a newly born non-player character is triggered to evolve for this event, to avoid damage caused by the event or reduce damage of the event.

Still using the example in which the target attribute is a life attribute, the second value may be 30% of the life attribute value. When the first character is attacked by the second event and the health points are reduced by 30% or above, the non-player character is triggered to evolve, so as to evolve a skill attribute for fighting against the second event, so that when the second event is encountered next time, the damage brought by the second event to the first character is avoided or reduced.

For other attributes, methods similar to the foregoing method are used, and are not described in detail in this application.

In the technical solution provided in step S404, before the configuration information corresponding to the target event is obtained, if the encounter with an attack event each time can bring evolution to the non-player character, the non-player character is excessively strong, and when the game player character battles against the non-player character, the game difficulty is excessively high. Consequently, experience of the game player is affected, and the interest of playing the game by the game player is reduced. Therefore, evolution may be performed in the following random manner.

An evolution probability corresponding to a level of the first character is obtained before the configuration information corresponding to the target event is obtained. The evolution probability is a probability of allowing the second character to obtain an attribute used for dealing with the target event. The step of obtaining the configuration information corresponding to the target event is executed when the evolution probability is greater than a preset probability.

In an embodiment, a function for obtaining a random number between 0 and 1 may be configured in the game. Each time an evolution probability corresponding to a level of the first character is obtained, the function may be executed once, and a level parameter of the first character is used as an input parameter of the function, and an obtained random value is used as the evolution probability corresponding to the level of the first character. Then the evolution probability is compared with a threshold (e.g., a preset probability, such as 0.5, 0.6, or 0.9), and if the evolution probability is greater than the threshold, a non-player character born in a next generation is evolved, and otherwise, the non-player character born in the next generation is not evolved.

It is noted that the evolution probability corresponding to the level of the first character may also be obtained in other manners according to actual requirements in addition to the foregoing manner.

The configuration information corresponding to the target event may be obtained according to a first attribute used for dealing with the target event The first attribute is used for indicating that when the target event occurs, the degree of modifying the target attribute value of the second character by the target event is less than the degree of modifying the target attribute value of the first character. The configuration information is used for configuring parameters of the first attribute. The configuration information may be obtained according to a second attribute used for dealing with the target event. The second attribute is used for instructing to execute a defense event used for preventing the target event from occurring when the target event is about to occur. The configuration information is used for configuring parameters of the second attribute.

In an embodiment, whether to configure the foregoing first attribute or second attribute may be determined according to a requirement, and may be specifically determined according to a specific target event. For example, for an attack event (may cause a blood loss to a non-player character) initiated by a player, a defense attribute (e.g., the first attribute) of a user may be configured in this case to avoid blood loss or reduce blood loss when attacked. For another example, for a target event of capturing a weapon initiated by the user, an escape attribute (e.g., the second attribute) of the non-player character may be configured; when it is determined, through some behaviors of the player character, that the player character is about to initiate the target event of capturing the weapon, the escape attribute of the non-player character is triggered to escape away from the player character (e.g., the defense event). For another example, when the non-player character touches an obstacle (e.g., the target event in which the game environment modifies the target attribute value of the first character), some attributes (such as health points) of the player may be affected. In this case, evolution of the second attribute may also be triggered. Before a newly born non-player character touches the obstacle, the position of the obstacle is actively detected, and the obstacle is dodged in real time (e.g., executing the defense event for preventing the target event from occurring), to avoid damage of the obstacle.

In an embodiment, the foregoing configuring the first attribute and second attribute may refer to newly adding the first attribute or the second attribute, or reconfiguring attribute parameters of the first attribute or the second attribute, to make corresponding defense skills stronger, for example, accelerate the escape speed.

In the foregoing embodiment, when the first attribute or the second attribute used for dealing with the target event is determined, reference may be made to a processing manner of another player when the another player meets a same event, so as to determine which attribute is the first attribute or the second attribute. The specific method is as follows: saving an attribute that is used by the player character when the player character deals with the target event as the first attribute, and saving parameters of the attribute used by the player character in a case in which a degree of modifying a target attribute value of the player character by the target event is less than the degree of modifying the target attribute value of the first character when it is detected that the target event associated with the player character is executed.

In an embodiment, when the first attribute or the second attribute used for dealing with the target event is determined, a skill attribute used for dealing with the target event may alternatively be defined by a game developer.

In the technical solution provided in step S406, the method configures the second character using the configuration information when the second character is generated. In an embodiment, the method configures, using the configuration information, attributes of a plurality of second characters generated simultaneously when the second characters are generated. The plurality of second characters belongs to a same level, and is used for supplementation into the game.

The evolution idea in the related technology is based on the design of an AI character, and skill attributes of AI characters at birth are completely the same. AI characters improve in a training process. With improvement of the AI characters in training, appearances, and the like thereof also accordingly change. In this case, the user can determine information such as the fighting capacity of the AI character according to the appearance, and the like thereof, so as to use a pertinent processing manner.

In this application, each generation of newly born AI characters evolves corresponding skill attributes with reference to experience of dead AI (or attacked AI). In this way, skill attributes of AIs of different generations are different, and a design for evolving the AI population is implemented. In this way, when a game player battles against AI, skill level of the AI cannot be determined.

To facilitate further understanding of the technical solution of this application, the battle game of Snake is described in detail as an example. For the Snake, the usual design is to make the intelligence of the game AI change with the length or value growth of the player, or change with the length or value increase of the game AI. In this way, a longer snake has higher intelligence, and a newborn snake has weak intelligence, the entire AI snake group has no evolution probability, and the overall difficulty does not increase with time. To overcome the foregoing problem, the technical solution of this application may be used for improvement.

Figure 5:
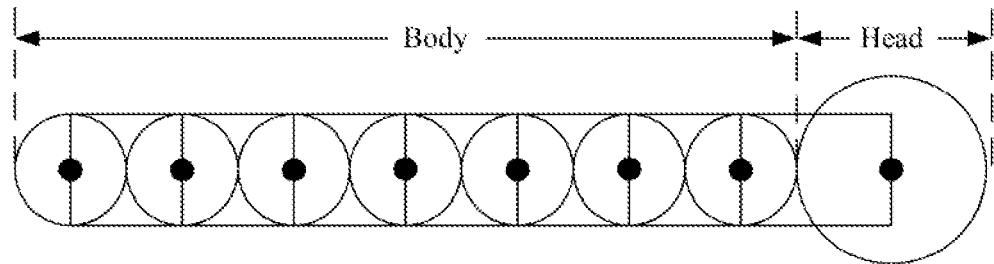
FIG. 5 is a schematic diagram of an AI snake according to an embodiment of this application.

In this solution, as shown in FIG. 5, the intelligent AI snake is composed of a head and a body, and the head area is an independent circle, which can support a variety of skins and styles, and the crash detection area of the body is formed by splicing a plurality of circles and a plurality of rectangles. The advantage of this combination manner is that the shape and position of the body can be accurately described with the least amount of geometry.

Figure 6:
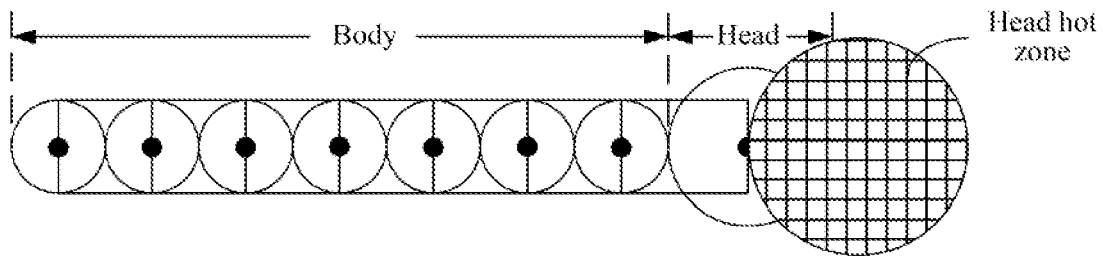
FIG. 6 is a schematic diagram of a head hot zone of the AI snake according to an embodiment of this application.

The concept of a head hot zone may be added to each intelligent AI snake, and the attack against the player or other snakes is realized by controlling the AI snake to actively attack the head hot zones of other snakes. The schematic diagram of the head hot zone is shown in FIG. 6.

In some embodiments, head hot zone refers to a particular range in which the head of the snake is located in the game Snake. The intelligent AI snake actively accelerate through this area, so that heads of other snakes run into the body of the intelligent AI snake and are killed.

All the snakes in the game have a travel speed by default, and if the head of the snake runs into the body of another player, the snake will die. Therefore, the head hot zone is in the front part of the head. If the snake passes quickly through the head hot zone of another player at a particular speed, if the other party does not dodge it in time, the other party is killed.

The intelligent AI snake actively attacks the head hot zone of the head of another snake according to its own attributes (mainly controlled by attack detection frequency, field of view, etc.). In addition, the intelligence of the intelligent AI snake includes, but is not limited to:

(1) the travel speed, related to the level, specifically referring to the speed at which the snake moves in a normal state;
(2) the frequency of steering, related to the level, specifically referring to the time interval during which the snake adjusts the moving direction in a normal state;
(3) the maximum angle of steering, related to the level, specifically referring to the maximum angle at which the snake adjusts the direction in a normal state;
(4) the accelerated travel speed, related to the level, specifically referring to the speed at which the snake moves in an accelerated state;
(5) the maximum angle of accelerated steering, related to the level, specifically referring to the maximum angle at which the snake adjusts the direction in the accelerated state;
(6) the size of the field of view, related to the level, specifically referring to the size of the range that the snake can detect (including food and other snakes within the detection range);
(7) the probability of actively accelerating the contention for high-energy food, related to the level, specifically referring to the probability of accelerating the contention for the dead bodies of other snakes; and
(8) the frequency of searching for ordinary food, related to the level, specifically referring to the time interval for detecting ordinary food.

During implementation, if an AI snake has a particular trait within a particular probability range, then its descendants will naturally have this trait, and this is no longer a probability event. Different generations of AI are unknown to the player, and the difference in AI intelligence may be felt during the confrontation process. Therefore, the design of the technical solution of this application is applicable to various game scenarios that require battles between a player and game AI.

When the technical solution of this application is implemented, the development and verification environment may be development tool software (such as WebStorm) used on a machine such as Windows (such as Win 7 and other versions) or Linux (such as Mac OSX, Ubuntu, and Debian). The development language used may be JavaScript, C++, Java, and the like. The game engine used may be cocos2d-js, and the like.

Figure 7:
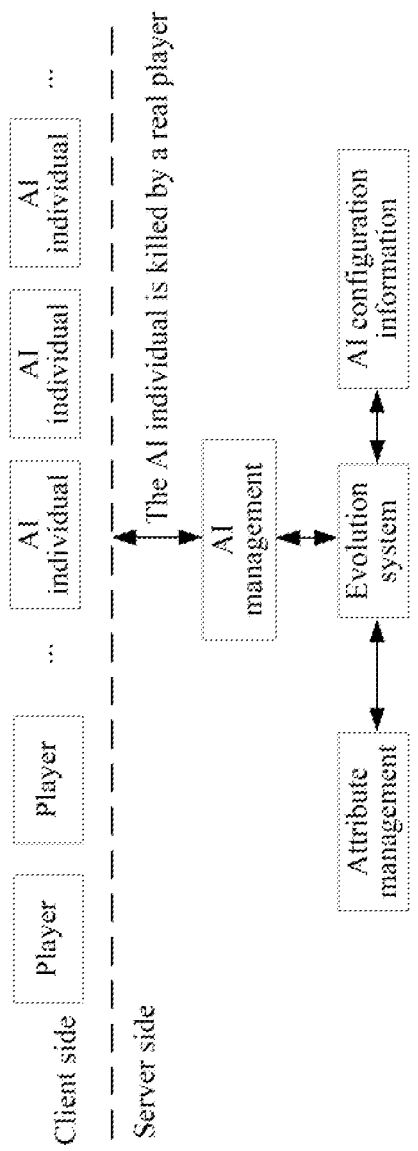
FIG. 7 is a schematic diagram of an evolution system according to an embodiment of this application.

As shown in FIG. 7, in some embodiments, when the game AI character on the client side is killed by the real player (e.g., the event that the AI is killed), the evolution logic of the group is triggered, and the evolution logic is based on the current level of the killed AI. An AI management module obtains the probability that the level can evolve a particular attribute (skill), and the evolution system determines whether the evolution can succeed. If the evolution succeeds, then the AI character born after this time point will upgrade by one level by default, and this level of AI is born with this attribute or skill (such as fast dodge, time-limited invincibility, limited time stealth, etc., which may be configured according to product requirements). Specifically, the attribute management module manages related attributes. As time passes by, game AI characters will have increasingly perfect intelligence and skill attributes. Each generation of AI character attributes will be saved in the AI configuration information (e.g., AI Config Data). Some examples of attributes of the AI are shown in FIG. 8, such as the current level of the snake, the initial moving speed of the snake, and the initial turning angular velocity of the snake.

After the evolution is completed, the newly born snake will have the corresponding skills.

Each attribute in the AI configuration information (e.g., evolution configuration) changes with the update of the AI snake generation by generation, and the birth attribute of the intelligent AI snake is defined therein. These attributes may define some values at the time of birth. In the process of constantly eating food and attacking other snakes, the intelligent AI snake will continue to grow, become longer and faster, and thus have more powerful aggression. For example, whether the snake steers, dodges, or finds food in the moving process is determined. Herein, the Math.random( ) function may be used to obtain a random decimal with a value between 0 and 1. Time of each frame and the corresponding attribute configuration time are multiplied by the base, to obtain a value. Then the function math.round is used to round off the value. If the value is less than 0.5, the value is 0, and if the value is greater than 0.5, the value is 1. If the value is 0 herein, the corresponding steering, food finding, acceleration, or other intelligent events are triggered, and otherwise the corresponding events are not triggered.

In an embodiment, the intelligent AI snake may determine whether to dodge the body of the snake in front according to the attribute of the intelligent AI snake. If the intelligent AI snake needs to dodge, the intelligent AI snake first decelerates, and then switches a moving direction. In the implementation of this application, the intelligent AI snake intelligently accelerates the grabbing of food and dodges crashes, and wanders in the game to cat food in a normal state, and this is similar to the operation of a real player.

By using the technical solution of this application, according to the evolution theory of genes, an AI character is killed or injured, thereby triggering an evolution probability event of the population, and the probability of population evolution is determined by the attribute of the killed AI. Once the evolution succeeds, the population has this phase attribute by default or the value of the existing attribute increases. Descendants born after the evolution of the population will have such attributes and corresponding values.

Players will continue to kill a game object that moves slowly and that has weak skill attributes. The attributes of the game AI will increase as the basic attributes of the player increase, and this increase goes with the growth of the player, and is determined according to the difficulty of the game object killed by the player, rather than preset in advance, so that the player can obtain battle fun similar to that of battling against a real player. Since there is no need to use complex state machines, there is no need to enumerate a large number of event logics, and the development workload is greatly reduced.

It is noted that for simple descriptions, the foregoing method embodiments are stated as a series of action combinations. However, a person skilled in the art may know that this application is not limited to the sequence of the described actions because according to this application, some steps may use another sequence or may be simultaneously performed. In addition, a person skilled in the art may also know that all the embodiments described in this specification are exemplary embodiments, and the related actions and modules are not necessarily required in this application.

Based on the foregoing descriptions of the embodiments, a person skilled in the art may clearly understand that the method in the foregoing embodiments may be implemented by software in addition to a universal hardware platform or by hardware. However, the former is a better implementation in most cases. Based on such an understanding, the technical solutions of this application essentially or the part contributing to the related technology may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of this application.

According to the embodiments of this application, a character configuration apparatus configured to implement the foregoing character configuration method is further provided. FIG. 9 is a schematic diagram of an optional character configuration apparatus according to an embodiment of this application. As shown in FIG. 9, the apparatus may include one or more processors, and one or more memories storing program units. The program units are executed by the processors. The program units include a detection unit 92. a first obtaining unit 94, and a configuration unit 96.

The detection unit 92 detects a target event associated with a first character in a game. The first character is a non-player character that battles against a player character using artificial intelligence and that is generated in the game. The target event is used for instructing to modify a target attribute value of the first character.

The first obtaining unit 94 obtains configuration information corresponding to the target event. The configuration information is used for configuring a second character, so that when the configured second character deals with the target event, a degree of modifying a target attribute value of the second character by the target event is less than a degree of modifying the target attribute value of the first character when the first character deals with the target event. The second character is a non-player character to be generated in the game.

The configuration unit 96 is configured to configure the second character using the configuration information when the second character is generated.

It is noted that the detection unit 92 in this embodiment may be configured to execute step S402 in the foregoing embodiment of this application. The first obtaining unit 94 in this embodiment may be configured to execute step S404 in the foregoing embodiment of this application. The configuration unit 96 in this embodiment may be configured to execute step S406 in the foregoing embodiment of this application.

It is noted herein that examples and application scenarios implemented by the foregoing modules and corresponding steps are the same but are not limited to the content disclosed in the foregoing embodiments. It is noted that the foregoing modules may be run in the hardware environment shown in FIG. 3 as a part of the apparatus, and may be implemented through software, or may be implemented through hardware.

Through the foregoing modules, when the target event initiated for the first character in the game is detected, the configuration information corresponding to the target event is obtained, and the generated second character is configured using the configuration information, so that the degree of modifying the target attribute value of the second character by the target event is reduced when the configured second character deals with the target event. In this way, with the evolution of the non-player character, although a new character born each time has a same initial appearance, the new character has new skill attributes. For a large number of non-player characters in the game, due to different birth times, skill attributes owned by them are not completely the same, and skill attributes used for dealing with a same event are also different, so that the game characters cannot determine, through attempts for a plurality of times, the skill attributes used by the non-player characters when the non-player characters deal with a fixed event. In this way, the technical problem in the related technology that an operating mechanism of an artificial intelligence character can be known can be resolved, thereby preventing the operating mechanism of the artificial intelligence character from being known.

The foregoing game may be a game of any type. The first character is a non-player character attacked by the target event. The second character is a non-player character born in a next generation (or next level). The target event is an event that can cause damage to a particular attribute (e.g., the target attribute) of the first character. The target attribute includes but is not limited to life, a skill, a weapon, defense, and the like.

In current real-time multiplayer battle games, AI objects need to be used, for increasing game competition and fun. The AI may be used for training players to be familiarized with various operating skills in an initial period, or interacting with players when there are an insufficient number of online players, to attract more real players. However, the current AI causes a relatively poor interactive effect due to various reasons.

This application implements a game AI (e.g., a non-player character using artificial intelligence) evolution apparatus based on a biological evolution basic principle. By simulating a principle of biological evolution, a self-evolution capability is bestowed to a game AI system, so that the game AI obtains intelligence that increases with time natural development and various skill attributes. The design idea of the method, in some embodiments, is to use a whole game AI group as an evolution object, rather than using a single AI character as an object for evolution and upgrade. A specific implementation method is that, when a game AI character is killed by a real player, an evolution logic of the group is triggered, and the evolution logic obtains, according to a value of a generation (starting from the first generation or the first level by default) on which the killed AI is currently located, a probability that the generation can evolve a particular attribute property (such as skills), and determines whether evolution of this time can succeed. If the evolution succeeds, the AI born at this time point becomes a next generation or a next level by default, and the next-generation AI owns this attribute property by nature. As time passes by, the game AI will have increasingly perfect intelligence and skill attributes.

Moreover, with the increase of the number of AIs killed by the player, the AI also triggers attribute increase of the skills that are already owned, and the probability is also obtained. Once the probability is successfully obtained, the next-generation AI born subsequently will have the attribute value by default. In such a growth system, growth curves of the AIs are different, and therefore the battle experiences of the rounds are not completely the same.

In the foregoing embodiment, the detection unit includes a first detection module and a second character. The first detection module detects the target event generated when the player character launches an attack against the first character when the first character battles against the player character. The second detection module detects the target event in which a game environment of a target position modifies the target attribute value of the first character when the first character is located at the target position of a map of the game. The foregoing target attribute may be an attribute used for indicating life, a skill, a weapon, defense, and the like. For example, for a life attribute, the target event is an event for reducing an attribute value of the life attribute. For a skill attribute, in some examples, the target event is an event for capturing the skill attribute of the first character or for reducing the damage of the skill attribute to the player character. For another example, for a weapon attribute, the target event is an event for capturing a weapon of the first character, reducing the damage caused by the weapon or destroying the weapon. For the remaining attributes, any event that can cause a change to an attribute value of a corresponding attribute is a target event, and the target events are not listed one by one in this application.

For the weapon attribute, in some examples, when the first character battles against the player character, a target event generated when the player character launches an attack against the first character to capture the weapon of the first character is detected. If the weapon of the first character is captured successfully, a newly born character is triggered to evolve, so that the newly born character can escape or strike back in time when the player captures the weapon of the newly born character, and this is specifically implemented by configuring an escape skill attribute, a defense skill attribute, or the like of the newly born character.

In an embodiment, the first detection module includes: a first detection submodule and a second detection submodule. The first detection submodule detects a first event when the player character launches an attack against the first character. The first event is used for reducing the target attribute value of the first character to a first value. The first value is less than a target attribute maximum value of the first character and not less than a target attribute minimum value of the first character. The second detection submodule detects a second event when the player character launches an attack against the first character. The second event is used for reducing the target attribute value of the first character to a second value. The second value is a positive number.

The foregoing target attribute may be an attribute used for indicating life, a skill, a weapon, defense, and the like. For example, in some examples, for a life attribute, the target event is an event for reducing an attribute value of the life attribute. For a skill attribute, the target event is an event for capturing the skill attribute of the first character or for reducing the damage of the skill attribute to the player character. For another example, for a weapon attribute, the target event is an event for capturing a weapon of the first character, reducing the damage caused by the weapon or destroying the weapon. For the remaining attributes, any event that can cause a change to an attribute value of a corresponding attribute is a target event, and the target events are not listed one by one in this application.

For the weapon attribute, when the first character battles against the player character, a target event generated when the player character launches an attack against the first character to capture the weapon of the first character is detected. If the weapon of the first character is captured successfully, a newly born character is triggered to evolve, so that the newly born character can escape or strike back in time when the player captures the weapon of the newly born character, and this is specifically implemented by configuring an escape skill attribute, a defense skill attribute, or the like of the newly born character.

The second value indicates that when a particular event causes fixed damage (e.g., causes a damage that the attribute value is reduced by the second value) to the first character, a newly born non-player character is triggered to evolve for this event, to avoid damage caused by the event or reduce damage of the event.

In an embodiment, before the configuration information corresponding to the target event is obtained, if the encounter with an attack event each time can bring evolution to the non-player character, the non-player character is excessively strong, and when the game player character battles against the non-player character, the game difficulty is excessively high. Consequently, experience of the game player is affected, and the interest of playing the game by the game player is reduced.

To overcome the foregoing problem, the apparatus of this application may further include a second obtaining unit. The second obtaining unit obtains an evolution probability corresponding to a level of the first character before the first obtaining unit obtains the configuration information corresponding to the target event. The evolution probability is a probability of allowing the second character to obtain an attribute used for dealing with the target event, where the first obtaining unit is instructed to obtain the configuration information corresponding to the target event when the evolution probability is greater than a preset probability.

In another embodiment, the first obtaining unit includes: a first determining module and a second determining module. The first determining module determines a first attribute used for dealing with the target event, and determines the configuration information according to the first attribute. The first attribute is used for indicating that when the target event occurs, the degree of modifying the target attribute value of the second character by the target event is less than the degree of modifying the target attribute value of the first character. The configuration information is used for configuring parameters of the first attribute. The second determining module determines a second attribute used for dealing with the target event, and determines the configuration information according to the second attribute. The second attribute is used for instructing to execute a defense event used for preventing the target event from occurring when the target event is about to occur. The configuration information is used for configuring parameters of the second attribute.

In actual application, whether to configure the foregoing first attribute or second attribute may be determined according to an actual requirement, and may be specifically determined according to a specific target event. For example, for an attack event (may cause a blood loss to a non-player character) initiated by a player, a defense attribute (e.g., the first attribute) of a user may be configured in this case to avoid blood loss or reduce blood loss when attacked. For another example, for a target event of capturing a weapon initiated by the user, an escape attribute (e.g., the second attribute) of the non-player character may be configured; when it is determined, through some behaviors of the player character, that the player character is about to initiate the target event of capturing the weapon, the escape attribute of the non-player character is triggered to escape away from the player character (e.g., the defense event). For another example, when the non-player character touches an obstacle (e.g., the target event in which the game environment modifies the target attribute value of the first character), some attributes (such as health points) of the player may be affected. In this case, evolution of the second attribute may also be triggered. Before a newly born non-player character touches the obstacle, the position of the obstacle is actively detected, and the obstacle is dodged in real time (e.g., executing the defense event for preventing the target event from occurring), to avoid damage of the obstacle.

In an embodiment, the foregoing configuring the first attribute and second attribute may refer to newly adding the first attribute or the second attribute, or reconfiguring attribute parameters of the first attribute or the second attribute, to make corresponding defense skills stronger, for example, accelerate the escape speed.

In the foregoing embodiment, when the first attribute or the second attribute used for dealing with the target event is determined, reference may be made to a processing manner of another player when the another player meets a same event, so as to determine which attribute is the first attribute or the second attribute. Specifically, this may be implemented by the first determining module. The first determining module is further configured to save an attribute that is used by the player character when the player character deals with the target event as the first attribute, and save parameters of the attribute used by the player character in a case in which a degree of modifying a target attribute value of the player character by the target event is less than the degree of modifying the target attribute value of the first character when it is detected that the target event associated with the player character is executed.

In an embodiment, when the first attribute or the second attribute used for dealing with the target event is determined, a skill attribute used for dealing with the target event may alternatively be defined by a game developer.

In an embodiment, the configuration unit configures, using the configuration information, attributes of a plurality of second characters generated simultaneously when the second characters are generated. The plurality of second characters belongs to a same level, and is used for supplementation into the game.

The evolution idea in the related technology is based on the design of an AI character, and skill attributes of AI characters at birth are completely the same. AI characters improve in a training process. With improvement of the AI characters in training, appearances, and the like thereof also accordingly change. In this case, the user can determine information such as the fighting capacity of the AI character according to the appearance, and the like thereof, so as to use a pertinent processing manner.

In this application, each generation of newly born AI characters evolves corresponding skill attributes with reference to experience of dead AI (or attacked AI). In this way, skill attributes of AIs of different generations are different, and a design for evolving the AI population is implemented. In this way, when a game player battles against AI, skill level of the AI cannot be determined.

It is noted herein that examples and application scenarios implemented by the foregoing modules and corresponding steps are the same but are not limited to the content disclosed in the foregoing embodiments. It is noted that the foregoing modules may be run in the hardware environment shown in FIG. 3 as a part of the apparatus, and may be implemented through software, or may be implemented through hardware. The hardware environment includes a network environment.

According to the embodiments of this application, an electronic apparatus configured to implement the foregoing character configuration method is further provided.

Figure 10:
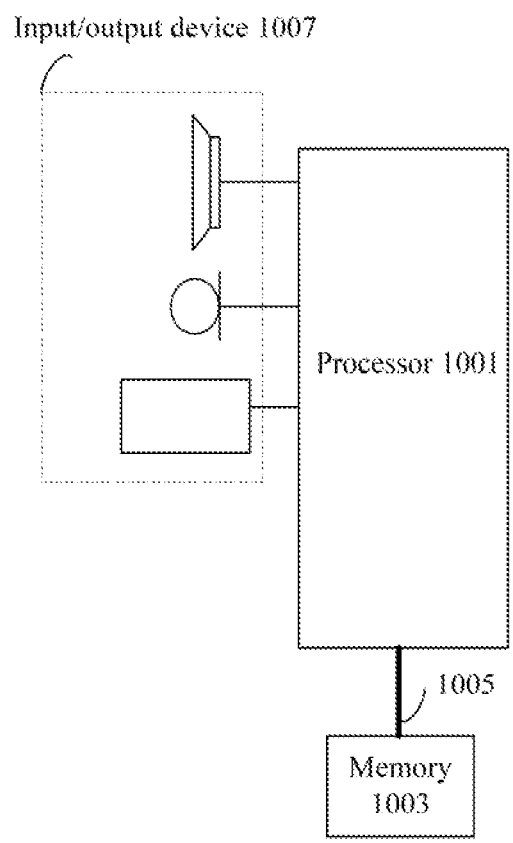
FIG. 10 is a structural block diagram of an electronic apparatus according to an embodiment of this application.

FIG. 10 is a structural block diagram of an electronic apparatus according to an embodiment of this application. As shown in FIG. 10, the electronic apparatus may include: one or more (one processor is shown in FIG. 10) processors 1001, a memory 1003, and a transmission apparatus 1005. As shown in FIG. 10, the electronic apparatus may further include an input/output device 1007.

The memory 1003 may be configured to store software programs and modules, for example, program instructions/modules corresponding to the character configuration method and apparatus in the embodiments of this application. The processor 1001 is configured to run the software programs and modules stored in the memory 1003, to perform various functional applications and data processing, to be specific, implement the foregoing character configuration method. The memory 1003 may include a high-speed random memory, and may also include a nonvolatile memory such as one or more magnetic storage apparatuses, a flash memory, or another nonvolatile solid-state memory. In some embodiments, the memory 1003 may further include memories remotely disposed relative to the processor 1001, and these remote memories may be connected to the terminal through a network. Examples of the network include, but are not limited to, the Internet, an intranet, a local area network, a mobile communications network, and a combination thereof.

The transmission apparatus 1005 is configured to receive or send data through a network, and may further be used for data transmission between the processor and the memory. Specific examples of the foregoing network may include a wired network and a wireless network. In an embodiment, the transmission apparatus 1005 includes a network interface controller (NIC) that may be connected to another network device and a router by using a network cable, thereby communicating with the Internet or a local area network. In an example, the transmission apparatus 1005 is a radio frequency (RF) module, and is configured to wirelessly communicate with the Internet.

In an embodiment, the memory 1003 is configured to store an application program.

The processor 1001 may invoke the application program stored in the memory 1003 by using the transmission apparatus 1005 to detect a target event associated with a first character in a game. The first character is a non-player character that battles against a player character using artificial intelligence and that is generated in the game. The target event is used for instructing to modify a target attribute value of the first character. The application program obtains configuration information corresponding to the target event. The configuration information is used for configuring a second character, so that when the configured second character deals with the target event, a degree of modifying a target attribute value of the second character by the target event is less than a degree of modifying the target attribute value of the first character when the first character deals with the target event. The second character is a non-player character to be generated in the game. The application program configures the second character using the configuration information when the second character is generated.

By using this embodiment of this application, when the target event initiated for the first character in the game is detected, the configuration information corresponding to the target event is obtained, and the generated second character is configured using the configuration information, so that the degree of modifying the target attribute value of the second character by the target event is reduced when the configured second character deals with the target event. In this way, with the evolution of the non-player character, although a new character born each time has a same initial appearance, the new character has new skill attributes. For a large number of non-player characters in the game, due to different birth times, skill attributes owned by them are not completely the same, and skill attributes used for dealing with a same event are also different, so that the game characters cannot determine, through attempts for a plurality of times, the skill attributes used by the non-player characters when the non-player characters deal with a fixed event. In this way, the technical problem in the related technology that an operating mechanism of an artificial intelligence character can be known can be resolved, thereby preventing the operating mechanism of the artificial intelligence character from being known.

In an embodiment, refer to the examples described in the foregoing embodiments for specific examples in this embodiment. Details are not described in this embodiment.

A person of ordinary skill in the art may understand that, the structure shown in FIG. 10 is a schematic. The terminal may be a terminal device such as a smartphone (such as an Android mobile phone or an iOS mobile phone), a tablet computer, a palmtop computer, a mobile Internet device (MID), or a PAD. FIG. 10 does not limit the structure of the foregoing electronic apparatus. For example, the terminal may further include more or less components (such as a network interface and a display apparatus) than those shown in FIG. 10, or has a configuration different from that shown in FIG. 10.

Persons of ordinary skill in the art may understand that all or some of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

An embodiment of this application further provides a storage medium. In an embodiment, in this embodiment, the storage medium stores a computer program. The computer program, when run, is configured to perform the character configuration method.

In an embodiment, in this embodiment, the storage medium may be located in at least one of a plurality of network devices in the network shown in the foregoing embodiments.

In an embodiment, in this embodiment, the storage medium is configured to store program code for performing the following steps:

S1: Detect a target event associated with a first character in a game. The first character is a non-player character that battles against a player character using artificial intelligence and that is generated in the game. The target event is used for instructing to modify a target attribute value of the first character.

S2: Obtain configuration information corresponding to the target event. The configuration information is used for configuring a second character, so that when the configured second character deals with the target event, a degree of modifying a target attribute value of the second character by the target event is less than a degree of modifying the target attribute value of the first character when the first character deals with the target event. The second character is a non-player character to be generated in the game.

S3: Configure the second character using the configuration information when the second character is generated.

In an embodiment, refer to the examples described in the foregoing embodiments for specific examples in this embodiment. Details are not described in this embodiment.

In an embodiment, the storage medium may include, but is not limited to: any medium that can store program code, such as a USB flash drive, a read-only memory (ROM), a random access memory (RAM), a removable hard disk, a magnetic disk, or an optical disc.

The sequence numbers of the foregoing embodiments of this application are for description purpose and do not indicate the preference of the embodiments.

If the integrated units in the foregoing embodiments are implemented in a form of software functional units and are sold or used as an independent product, the units may be stored in a computer readable storage medium. Based on such understanding, the technical solutions of this application essentially, or some contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of steps of the methods in the embodiments of this application.

In the foregoing embodiments of this application, descriptions of the embodiments have different emphases, and as for parts that are not described in detail in one embodiment, reference can be made to the relevant descriptions of the other embodiments.

In the several embodiments provided in the present application, it is understood that the disclosed client may be implemented in other manners. The described apparatus embodiments are schematic. For example, division of the units is division of logic functions, and there may be another division manner during actual implementation. For example, multiple units or components may be combined or may be integrated into another system, or some features may be omitted or not be executed. In addition, the displayed or discussed mutual coupling, or direct coupling, or communication connections may be implemented through some interfaces. Indirect coupling or communication connections between the units or modules may be implemented in electronic or other forms.

The units described as separate parts may or may not be physically separate, and the parts displayed as units may or may not be physical units, may be located in one position, or may be distributed on a plurality of network units. Some of or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated units may be implemented in a form of hardware or may be implemented in a form of a software functional unit.

The foregoing descriptions are exemplary implementations of this application, and it is noted that a person of ordinary skill in the art may further make several improvements and modifications without departing from the principle of this application. These improvements and modifications are also considered as the protection scope of this application.

What is claimed is:

1. A method for configuring a character in a game, the method comprising:
    generating a first non-player character in the game, the first non-player character having a first set of attributes;
    detecting an event affecting the first non-player character in the game;
    based on the first non-player character affected by the event, obtaining an evolution indicator indicating an evolution of the first non-player character; and
    in response to the evolution indicator indicating the evolution, generating two or more second non-player characters having a second set of attributes different from the first set of attributes while one or more non-player characters having the first set of attributes remain in the game.

2. The method according to claim 1, wherein the second set of attributes is associated with a second difficulty level that has a value higher than the first set of attributes of at least one of: attack power, life attribute, or defense power.

3. The method according to claim 1, wherein the second set of attributes is associated with a second difficulty level and is controlled with a next-generation artificial intelligence (AI) algorithm having higher difficulty than the first set of attributes.

4. The method according to claim 1, wherein the event decreases a health attribute of the first non-player character.

5. The method according to claim 1, wherein the generating the two or more second non-player characters comprises:
    in response to the first non-player character being eliminated from the game, generating a corresponding non-player character having the second set of attributes in the game.

6. The method according to claim 1, wherein the obtaining the evolution indicator comprises randomly selecting a value of the evolution indicator according to a probability distribution, the selected value of the evolution indicator indicating success or failure of the evolution.

7. The method according to claim 6, wherein the selecting the value of the evolution indicator according to the probability distribution is based on the first non-player character.

8. The method according to claim 1, wherein the second set of attributes includes at least one attribute value that is randomly generated based on the first non-player character.

9. The method according to claim 1, wherein the second set of attributes includes at least one attribute copied from a player character in the game.

10. The method according to claim 1, further comprising obtaining configuration information corresponding to the event, the configuration information defining the evolution and including at least one of
   a first attribute indicating that a degree of decreasing a life attribute value of non-player characters having the second set of attributes by the event is less than a degree of decreasing the life attribute value of non-player characters having the first set of attributes; or
   a second attribute providing a defense against the event.

11. The method according to claim 10, wherein the obtaining the configuration information comprises:
   saving an attribute that is used by a player character as the first attribute or the second attribute, the saved attribute being used by the player character in response to the event.

12. The method according to claim 10, wherein
   the obtaining the configuration information corresponding to the event is performed in response to the evolution indicator indicating the evolution, and
   the evolution indicator comprises an evolution probability, and the evolution indicator indicates the evolution when the evolution probability is greater than a preset probability.

13. The method according to claim 1, wherein the detecting the event comprises at least one of:
   detecting the event when a player character launches an attack against the first non-player character; or
   detecting the event when a game environment modifies a life attribute value of the first non-player character.

14. The method according to claim 13, wherein, when it is detected that the player character launches the attack against the first non-player character,
   the attack reduces the life attribute value of the first non-player character to a minimum life attribute value, or
   the attack reduces the life attribute value of the first non-player character to a non-minimum life attribute value.

15. The method according to claim 13, wherein the detecting the event when the player character launches the attack against the first non-player character comprises:
   detecting the event that is initiated by the player character only when the attack reduces the life attribute value of the first non-player character to a minimum life attribute value.

16. An apparatus for configuring a character in a game, the apparatus comprising:
   processing circuitry configured to:
      generate a first non-player character in the game, the first non-player character having a first set of attributes;
      detect an event affecting the first non-player character in the game;
      based on the first non-player character affected by the event, obtain an evolution indicator indicating an evolution of the first non-player character; and
      in response to the evolution indicator indicating the evolution generate two or more second non-player characters having a second set of attributes different from the first set of attributes while one or more non-player characters having the first set of attributes remain in the game.

17. The apparatus according to claim 16, wherein the second set of attributes is associated with a second difficulty level and is controlled with a next-generation artificial intelligence (AI) algorithm having higher difficulty than the first set of attributes.

18. The apparatus according to claim 16, wherein the event decreases a health attribute of the first non-player character.

19. The apparatus according to claim 16, wherein the processing circuitry is further configured to:
   in response to the first non-player character being eliminated from the game, generate a corresponding non-player character having the second set of attributes in the game.

20. A non-transitory computer-readable medium storing computer-readable instructions therein which, when executed by a computer, cause the computer to perform:
   generating a first non-player character in a game, the first non-player character having a first set of attributes;
   detecting an event affecting the first non-player character in the game;
   based on the first non-player character affected by the event, obtaining an evolution indicator indicating an evolution of the first non-player character; and
   in response to the evolution indicator indicating the evolution, generating two or more second non-player characters having a second set of attributes different from the first set of attributes while one or more non-player characters having the first set of attributes remain in the game.

* * * * *